United States Patent Office 3,803,192
Patented Apr. 9, 1974

3,803,192
OXIDATION PRODUCTS OF COBALT COMPLEXES, PROCESS FOR OBTAINING SAME AND INSERTION PROCESS
Carlo Neri and Emilio Perrotti, San Donato Milanese, Italy, assignors to Snam Progetti S.p.A., Milan, Italy
No Drawing. Filed Dec. 30, 1970, Ser. No. 102,977
Claims priority, application Italy, Dec. 30, 1969, 26,424/69
Int. Cl. C07f 15/06
U.S. Cl. 260—270 R
3 Claims

ABSTRACT OF THE DISCLOSURE

A process is disclosed for preparing trivalent cobalt derivatives represented by the formula:

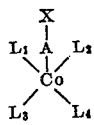

wherein $L_1$, $L_2$, $L_3$ and $L_4$ may belong to the same ligand molecule, e.g., a planar tetradentate ligand such as bis-(diacetylmonoximeimino)-propane, or to two molecules of a bidentate ligand such as o-phenantroline, or may be four monodentate ligands; A is a divalent radical such as —$CH_2$—; X is a functional group such as —$NO_2$: by causing the corresponding divalent cobalt complexes to react with molecular oxygen in the presence of an alcohol such as methanol, and a new trivalent cobalt compound is produced which is then allowed to react with a compound having the formula HA—X wherein A and X have the meaning set forth above.

---

The present invention refers to new cobalt compounds and to the process for obtaining same.

More particularly, the present invention refers to a process for the preparation of cobalt oxidation products.

It is known there are divalent cobalt complexes having the following formula:

wherein $L_1$, $L_2$, $L_3$ and $L_4$ may belong to the same ligand molecule, for example a planar tetradentate ligand as bis - (diacetylmonoximeimino)-propane, bis-(salycil-aldehyde)-ethylenediamine, or bis-(acetylacetone)-ethylenediamine; or may belong to two molecules of a bidentate ligand which may be selected from o-phenanthroline, 2-2' dipyridyl, nitroketones, acetylacetone, orthonitrosophenol, bidentate Schiff bases having the formula:

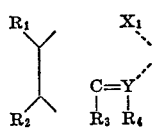

in which $R_1$, $R_2$, $R_3$ and $R_4$ may be hydrogen, substituted and unsubstituted alkyl or aryl radicals, $X_1$ may be oxygen, sulphur or nitrogen, whereas Y always is nitrogen, or they may be four monodentate ligands, equal or different, as nitriles, amines, phosphines, thioalcohols, nitrocompounds, halogen ions and so on.

It has now been found, that is an object of the present invention, the above cobalt complexes may be oxidized by molecular oxygen in presence of alcohols as methyl alcohol, ethylene chlorohydrine, ethylene glycol, benzyl alcohol, allyl alcohol and the like.

The oxidation reaction is carried out in a homogeneous or heterogeneous phase of the corresponding alcohol.

Oxygen is allowed to bubble at a temperature ranging from 0° C. to 70° C. and preferably at room temperature and at a pressure equal to or slightly higher than atmospheric.

According to the process of the present invention, the oxidation reaction may be carried out in the presence of both an anhydrous alcohol and an aqueous alcohol; moreover, it is possible to employ both the alcohol by itself and the alcohol mixed with inert diluents as aliphatic or aromatic hydrocarbons; the alcohol may be mixed also with an active solvent selected from pyridine, quinoline or any other aliphatic, heterocyclic or aromatic base.

A further object of the present invention concerns the products obtained by means of the aforesaid process.

If inert solvents are employed, they consist of dinuclear compounds having the formula:

$$[Co'''(L_1L_2L_3L_4)]_2CR_1R_2O \cdot 2B$$

in which $R_1$ and $R_2$ are hydrogen, substituted and unsubstituted alkyl or aryl radicals, B is an alcohol, an ether, or the water itself if the reaction is carried out in presence of a water-alcohol mixture.

On the contrary, if active solvents are employed, the reaction products are mononuclear compounds having the formula $$[Co'''(L_1L_2L_3L_4)]CR_1R_2R_3O \cdot CR_1R_2R_2OH \cdot B$$

in which $R_1$, $R_2$ and $R_3$ are hydrogen, an alkyl or an aryl radical, and B is selected from the above mentioned bases.

Moreover, it has been found, that it is the third object of the present invention, the above oxidation products can react with compounds having the formula $$HA-X$$

wherein A is a divalent radical selected from the following ones

or a substituted radical as

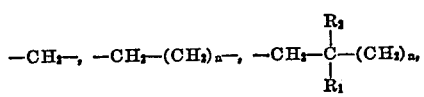

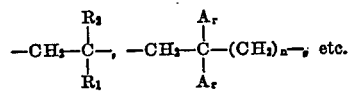

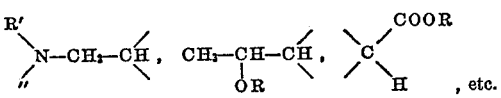

and X is a functional group —$NO_2$, —CN, $CH_3CO$—, —CHO, etc.; this reaction produces trivalent cobalt derivatives, which are the fourth object of the present invention and have the general formula:

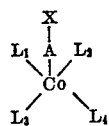

wherein A and X have the above reported meanings.

Typical unrestrictive examples of the insertion process according to the present invention, are the reactions with acetone, nitromethane, acetonitrile, acetaldehyde which form the following products

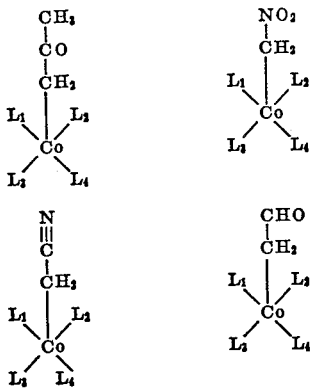

The insertion process according to the present invention can be carried out by suspending or dissolving the starting trivalent cobalt compounds either into the corresponding pure reactant or into the reactant diluted by the alcohol itself or by inert solvents. If the A radical of the HAX reactant is among those of the second group, the above process may be carried out by starting both from the β-substituted compound and from the corresponding unsaturated compound in presence of the mercaptan, the alcohol, the amine derivative and so on.

Crystalline derivatives are obtained with quantitative yields with respect both to the feed reactants and to the reaction products, which may be the final complexes and the oxidized alcoholic residues of the starting compounds.

The reactions may be carried out at a temperature ranging from 0 to 80° C., a slight heating being however preferable in order to increase the reaction rate.

The products which are the object of the present invention, may be employed as catalysts, in the dye industry, as intermediates in the dimerization reactions of monofunctional molecules in order to obtain double chain and difunctional molecules as it is described in a copending patent application of the same applicant.

The invention will now be illustrated by the following examples which have not to be understood as restrictive of it.

EXAMPLE 1

4 g. of Co (II) Salen [bis-(salycil-aldehyde)-ethylene-diiminate] were suspended into 50 cc. of methyl aclohol at room temperature. Oxygen was allowed to bubble into the suspension for about three hours under stirring.

The solid compound, obtained at the end of the reaction was filtered and washed by ether, and then dried under vacuum. The yield was higher than 90%.

EXAMPLES 2–4

By working at the same conditions of the preceding example 4 g. of Co-Salen were suspended into ethylene chlorohydrin, benzyl alcohol and allyl alcohol.

The obtained solid compound was filtered, washed by ether and then dried under vacuum. The yields were higher than 90%.

EXAMPLE 5

4 g. of Co-Salen were suspended into methyl alcohol containing about 10% of pyridine, at room temperature.

Oxygen was allowed to bubble for about three hours under stirring. The crystals of the trivalent cobalt pyridinate compound were isolated at the end of the reaction. The yield was quantitative.

EXAMPLE 6

4 g. of Co-Salen, oxidized in methyl alcohol, were suspended into a mixture consisting of 25 cc. of nitromethane and 25 cc. of methyl alcohol.

The suspension was heated for some minutes at 50–60° C. and then cooled at room temperature.

The solid compound was filtered, washed by ether and dried under vacuum.

A higher than 80% yield was obtained.

EXAMPLES 7–9

By working at the same conditions of the preceding example, three suspensions of the cobalt complex oxidized in methyl alcohol were formed; the first suspension consisted of 4 g. of the cobalt complex in a mixture of methyl alcohol and acetone; the second was consisting of 4 g. of the cobalt complex suspended into a methyl alochol-acetonitrile mixture and the third suspension was obtained by 4 g. of the cobalt complex in a methyl alcohol-acetaldehyde. Crystalline solid compounds were always obtained at yields higher than 90%.

What we claim is:

1. Trivalent cobalt compounds having the formulae:

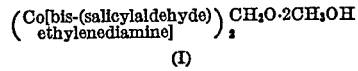

(I)

or

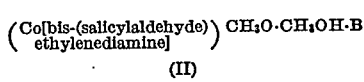

(II)

wherein B is pyridine or quinoline.

2. Trivalent cobalt compounds having the formulae:

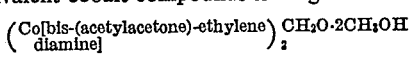

or

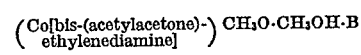

wherein B is pyridine or quinoline.

3. Trivalent cobalt compounds having the formulae:

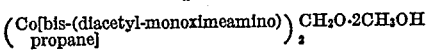

or

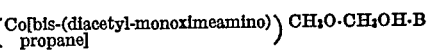

wherein B is pyridine or quinoline.

References Cited

UNITED STATES PATENTS 3,290,348 12/1966 Mullineaux _____ 260—439 R
3,584,021 6/1971 Costa et al. _____ 260—439 R
3,590,062 6/1971 Costa et al. _____ 260—439 R

OTHER REFERENCES

Cesari et al., Chemical Communications, 1970, pp. 276–7.

Costa et al., J. Orgmetalli. Chem. 15 (1968), pp. 187–194.

PATRICK P. GARVIN, Primary Examiner

A. P. DEMERS, Assistant Examiner

U.S. Cl. X.R.

260—439 R

UNITED STATES PATENT OFFICE
CERTIFICATE OF CORRECTION

Patent No. 3,803,192    Dated  April 9, 1974

Inventor(s)  Carlo Neri et al

It is certified that error appears in the above-identified patent and that said Letters Patent are hereby corrected as shown below:

Column 2, line 4, change "chlorohydrine" to

-- chlorohydrin --

Column 2, lines 63-68, the formula should read

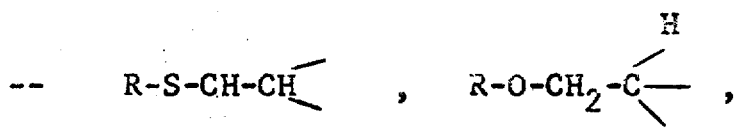

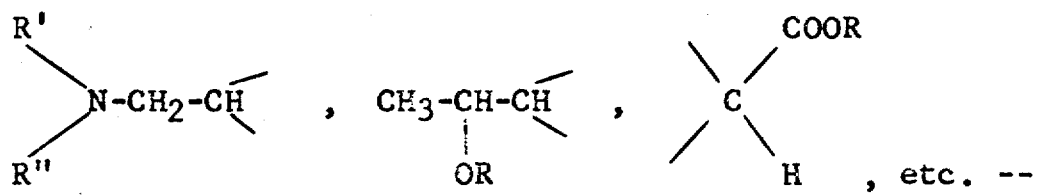

, etc. --

Signed and sealed this 10th day of September 1974.

(SEAL)
Attest:

McCOY M. GIBSON, JR.
Attesting Officer

C. MARSHALL DANN
Commissioner of Patents